May 5, 1959 W. HARTMANN 2,885,179
SPHERICAL BALL VALVE
Filed Aug. 26, 1957 2 Sheets-Sheet 1

INVENTOR
WERNER HARTMANN

May 5, 1959  W. HARTMANN  2,885,179
SPHERICAL BALL VALVE
Filed Aug. 26, 1957  2 Sheets-Sheet 2

INVENTOR
WERNER HARTMANN
By

United States Patent Office 2,885,179
Patented May 5, 1959

2,885,179

SPHERICAL BALL VALVE

Werner Hartmann, Ehlershausen Uber Lehrte, Germany

Application August 26, 1957, Serial No. 680,060

Claims priority, application Germany August 30, 1956

6 Claims. (Cl. 251—315)

The invention relates to a stopcock having a spherical plug.

The assembly of the cock having a spherical plug was achieved in previous constructions in such a manner that the housing of the cock was divided into two halves by a cut normal to the direction of flow through the cock or normal to the axis of the plug, and between which the plug and sealing gaskets were placed. The partition of the housing had several disadvantages. A pressure-resistant connection had to be provided between the two halves of the housing, and furthermore, these two halves had to be placed tightly together, to prevent the medium from flowing around the plug and leaking out of the housing.

To overcome these drawbacks, cocks of the kind described have been proposed, in which the sealing gaskets were secured to the housing, after inserting the plug into the undivided housing, by means of covering flanges screwed in direction of flow through the cock. The assembly and disassembly of the plug and the sealing gaskets, however, was only possible when the cock was taken out of the pipe line, as the covering flanges could only be screwed out of the housing when the pipe line was taken off, and in some cases, these flanges themselves constituted connections for attachment with the pipe line.

An object of the invention is to provide a stopcock with a spherical plug which is free from all the aforementioned disadvantages and also permits an economical construction, since all faces to be finished may be made by turning and boring out, respectively. According to the invention, the taking out and inserting of the plug and the sealing gaskets is possible without the need of dismantling the attached pipe line from the housing of the cock.

This is achieved according to the invention by having the plug and the sealing gaskets surrounded by a cylinder comprising two half shells, whereby the diameter of the cylinder is larger than that of the plug. This cylinder is inserted into an aperture in the housing, extending in the direction of the axis of the plug. The two half shells together with the inserted gaskets form on their outer surfaces a smooth cylindrical surface without projections, so that they may be inserted into the cylindrical aperture of the housing. The installation and the dismantling of the plug thus is a s simple as if a cylindrical or conical plug were used. All the parts which are affected by wear, this means primarily the plug and the two gaskets, are affected by the installation and dismantling, respectively. There will be no wear on the fitting surfaces of the cylinder consisting of two half shells and the inserted gaskets, with regard to the housing in operation, as these faces remain stationary with regard to each other.

The cylinder may be divided into two half shells in different ways, either by dividing the cylinder by a cut extending in direction of the axis of the plug and preferably normal to the flow passage, or by cutting the cylinder into two half shells in direction of te flow passage and normal to the axis of the plug.

The invention will now be described by way of example and with regard to the two embodiments shown in the drawing, in which.

Figure 1:
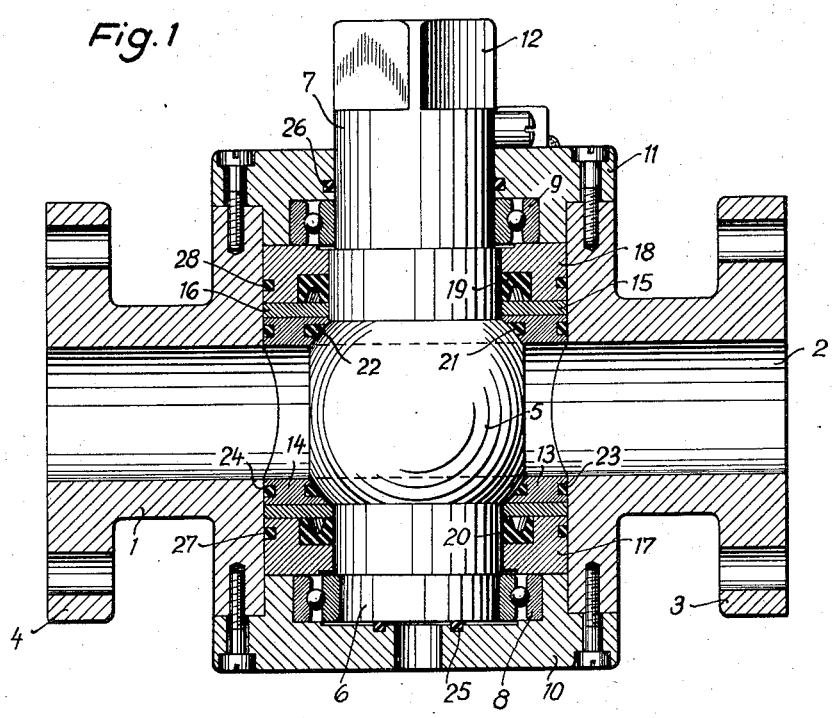
Fig. 1 is a longitudinal section of a stopcock constructed according to the invention.

The stopcock shown in Fig. 1 comprising a housing 1 with a flow passage 2 formed therethrough which, for example, is provided with the two attachment flanges 3 and 4. The housing is formed with a cylindrical valve chamber opening through the ends thereof and normal to and intercepting said flow passage 2, a valve assembly including a valve plug 5 being mounted in said chamber. The plug 5 is of spherical configuration and is provided at its upper and lower ends with journals 6 and 7 respectively, each being fitted into an anti-friction bearing 8 and 9 within the housing. The sealing of the plug 5 with respect to the housing 1 is achieved in any well known manner as by means of two rigid sealing rings 13 and 14 which are arranged in the path of flow. In order to improve the sealing effect, the rings 13 and 14 are equipped with packings 23 and 24, respectively, engaging the housing, and with packings 21 and 22, respectively, engaging the plug.

Figure 2:
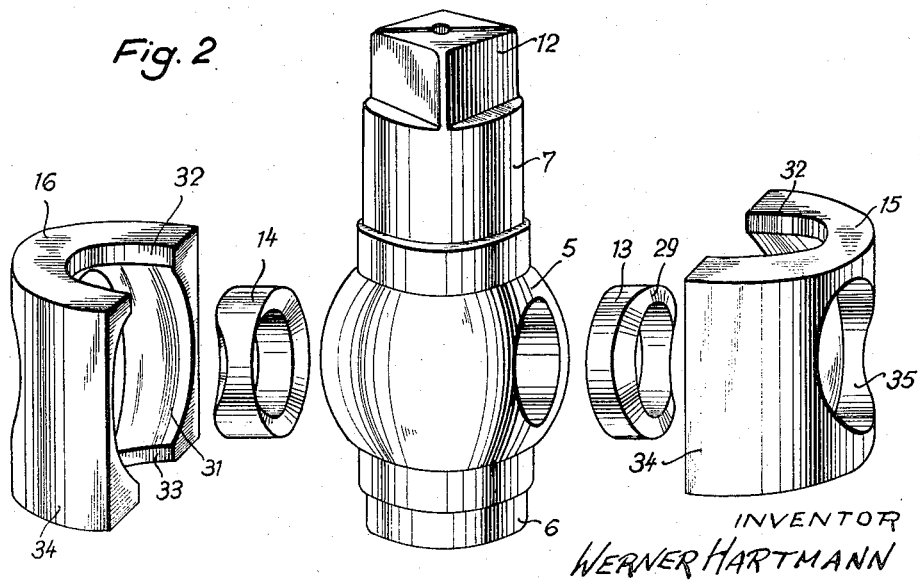
Fig. 2 is an exploded perspective view illustrating the shape and the arrangement of the main elements of the cock to be inserted into the aperture of the housing.

As best shown in Fig. 2, the plug 5 is surrounded by two half shells 15 and 16 which, in assembled condition, form a cylinder with a curved surface 34. For this purpose, the two half shells are provided with two hemispherical surfaces 31 which are turned out to accommodate the plug. In the upper and lower front faces of the two half shells, apertures 32 and 33 are provided, in which the journals 6 and 7 of the plug 5 are located. Furthermore, the two half shells are provided with bores 35, located coaxially with the flow passage 2 of the housing. The rings 13 and 14 are fitted with sliding fit into the bores 35. The faces 30 of the rings 13, 14 facing the plug 5 are shaped in a spherical concave manner, corresponding to the spherical surface of the plug, and, as described above, are provided with packings 21 and 22. The front faces 29 of the two rings 13 and 14 facing away from the plug are curved to conform to the surfaces of the cylinder, so that they are level with the cylindrical surface 34 of the two half shells 15 and 16, when these shells and the plug 5 are assembled. Preferably, said surfaces of the ring 13 are located somewhat lower with respect to the surface of the two shells. The cylinder composed of the two half shells 15 and 16 containing the plug 5 and the rings 13 and 14 are inserted into an aperture formed into the housing 1, crosswise to the direction of the flow, and is retained via a lower washer 17 and an upper washer 18 by means of two covers 10 and 11, secured in appropriate manner to the housing. The covers 10 and 11 at the same time constitute means to carry the outer rings of the anti-friction bearings 8 and 9, in order to pack the journals 6 and 7 of the plug. The washers 17 and 18 are provided with grooved sealing gaskets 19 and 20. In order to pack the washers 17 and 18 with respect to the housing, sealing gaskets 27 and 28 are provided. Sealing gaskets 25 and 26 are provided in the covers 10 and 11 to seal the anti-friction bearings 8 and 9 with respect to the outside thereof. The upper cover 11 is provided with an aperture through which the journal 7 with the square head 12 projects.

Figure 3:
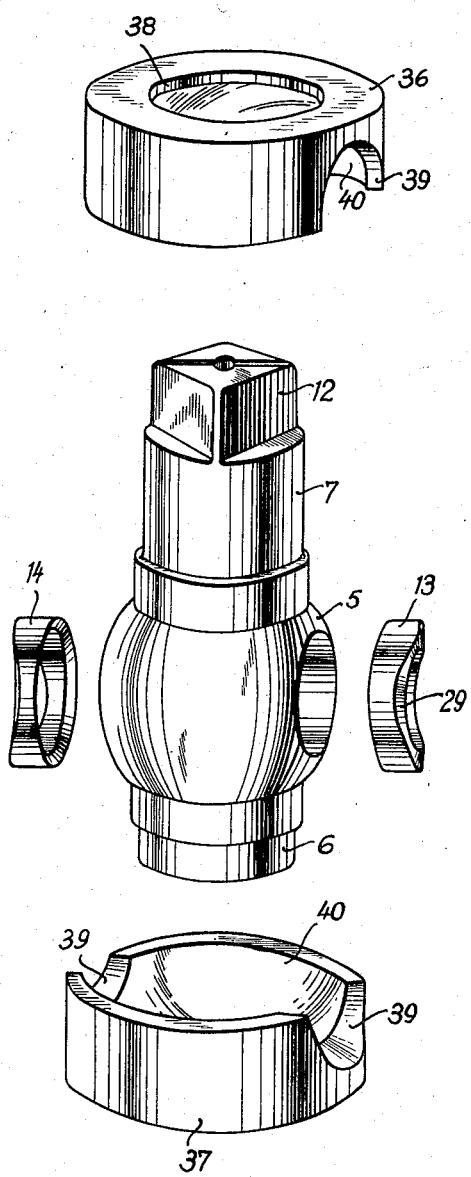
Fig. 3 is an exploded perspective view illustrating another shape and arrangement of the main elements of the cock to be inserted into the aperture of the housing.

In Fig. 3 there is shown an alternative mode of dividing the cylinder surrounding the plug 5 and the rings 13 and 14 into two half shells 36 and 37 by means of a cut extending in direction of the flow passage and normal to the axis of the plug. These shells are formed with inner surfaces 40 of concave spherical configuration to receive the plug 5. The upper half shell 36 has a central aperture 38 through its upper face, to allow the journal 7 of the plug 5 to project therethrough. In this same manner, the lower half shell 37 is provided with a central aperture (not visible) for the lower journal 6. The half shells are each provided with two diametrically disposed semicircular notches 39 in their adjoining edges, the corresponding notches 39 in said shells jointly forming cylindrical openings, similar to the apertures 35 in Fig. 2, for receiving the two rings 13 and 14. The installation in the housing also takes place in the manner as shown in Fig. 1.

It is possible to omit the two washers 17 and 18 and to extend the front faces of the two half shells 15 and 16 or 36 and 37 instead. It is also possible to form the washers 17 and 18 integral with the covers 10 and 11, whereby, if occasion arises, instead of the antifriction bearings 8 and 9, journal bearings may be used. The arrangement of separate washers 17 and 18, however, has the advantage in the embodiment of Fig. 1 that the sealing gaskets 19 and 20 can be inserted properly.

I claim:

1. A valve comprising a housing including a body and cover means, said body having a transverse flow passage and a valve chamber intersecting said passage and opening through at least one end of said body, means removably securing said cover means on said body and sealing said chamber, bearings within said housing at the ends of said chamber, said housing having an aperture through a wall at one end of said chamber and coaxial with said bearings, a valve plug including a spherical valve element having a diametrical flow opening and oppositely disposed coaxial journal portions perpendicular to said flow opening with an operating stem extending coaxially from one of said journal portions, said plug being disposed in said chamber with said journal portions rotatably mounted in said bearings and said stem extending through said end wall aperture, a pair of rigid sealing rings respectively disposed on opposite sides of said valve element and in axial alignment with said housing flow passage to provide a seal between said valve element and housing, and a pair of half shells jointly forming a valve sealing jacket having an inner spherical wall engaging said spherical valve element and an outer configuration conforming to and engaging the walls of said chamber in fixed relation to completely fill said chamber and position the axis of said valve flow opening in the plane of the axis of said housing flow passage, said jacket having a pair of oppositely disposed apertures coaxial with and of greater diameter than said housing passage and receiving said pair of sealing rings with a sliding fit, whereby wear is absorbed substantially exclusively by said sealing rings with said jacket and valve plug assembly completely filling said chamber to exclude wear-inducing fluid pressure therefrom, and said latter assembly is removable and insertable from and into said chamber as a unit upon removal of said cover means to enable replacement and repair of said sealing rings.

2. A valve according to claim 1 wherein said sealing rings have spherical inner surfaces engaging said valve element and outer surfaces conforming to and substantially flush with the outer walls of said jacket.

3. A valve according to claim 2 wherein said jacket forming half shells have their adjoining edges in a plane substantially coincident with the axis of said plug and chamber.

4. A valve according to claim 2 wherein said jacket forming half shells have their adjoining edges in a plane substantially coincident with the axis of said flow opening and passage.

5. A valve according to claim 2 wherein said chamber and jacket are cylindrical, said jacket being retained in fixed position in said chamber by frictional pressure from said cover means on the ends of said jacket.

6. A valve comprising a housing having a transverse flow passage and a valve chamber intersecting said passage, bearings within said housing at the ends of said chamber, said housing having an aperture through a wall at one end of said chamber and coaxial with said bearings, a valve plug including a valve element having a diametrical flow opening and oppositely disposed coaxial journal portions perpendicular to said flow opening with an operating stem extending coaxially from one of said journal portions, said plug being disposed in said chamber with said journal portions rotatably mounted in said bearings and said stem extending through said end wall aperture, a pair of rigid sealing rings respectively disposed on opposite sides of said valve element and in axial alignment with said housing flow passage to provide a seal between said valve element and housing, and a pair of half shells jointly forming a valve sealing jacket having an inner wall conforming to and engaging said valve element and an outer configuration conforming to and engaging the walls of said chamber in fixed relation to completely fill said chamber and position the axis of said valve flow opening in the plane of the axis of said housing flow passage, said jacket having a pair of oppositely disposed apertures coaxial with and of greater diameter than said housing passage and receiving said pair of sealing rings with a sliding fit, whereby wear is absorbed substantially exclusively by said sealing rings with said jacket and valve plug assembly completely filling said chamber to excude wear-inducing fluid pressure therefrom.

References Cited in the file of this patent

UNITED STATES PATENTS

| 2,376,975 | Morgan | May 29, 1945 |
| 2,768,806 | Koehler | Oct. 30, 1956 |
| 2,813,695 | Stogner | Nov. 19, 1957 |
| 2,819,035 | Graham | Jan. 7, 1958 |

FOREIGN PATENTS

| 296,103 | Switzerland | Apr. 1, 1954 |